United States Patent [19]
Philippi

[11] Patent Number: 4,556,345
[45] Date of Patent: Dec. 3, 1985

[54] MULTI-CORNERED REVERSIBLE CUTTING-PLATE

[75] Inventor: Engelbert Philippi, Saarwellingen, Fed. Rep. of Germany

[73] Assignee: Fried. Krupp Gesellschaft mit beschränkter Haftung, Essen, Fed. Rep. of Germany

[21] Appl. No.: 572,653

[22] Filed: Jan. 18, 1984

[30] Foreign Application Priority Data

Feb. 1, 1983 [DE] Fed. Rep. of Germany ....... 3303263

[51] Int. Cl.4 .......... B23P 15/28; B26D 1/00; B23B 27/02; B23B 27/22
[52] U.S. Cl. .................................. 407/114
[58] Field of Search .............. 407/113, 114, 115, 42, 407/48, 103

[56] References Cited

U.S. PATENT DOCUMENTS

| | | | |
|---|---|---|---|
| 1,838,520 | 12/1931 | Archer | 407/114 |
| 3,271,842 | 9/1966 | Breuning | 407/114 |
| 3,541,655 | 11/1970 | Stier | 407/113 |
| 3,613,197 | 10/1971 | Stier | 407/113 |
| 3,616,507 | 11/1971 | Wirfelt | 407/113 |
| 3,621,549 | 11/1971 | Billups | 29/96 |
| 3,935,624 | 2/1976 | Weinreich | 407/103 |
| 4,400,117 | 8/1983 | Smith | 407/49 |

FOREIGN PATENT DOCUMENTS 2483819 12/1981 France .

OTHER PUBLICATIONS

Publication "Werkstatt und Betrieb", 114, 1981, p. A-155.

Primary Examiner—Francis S. Husar
Assistant Examiner—William E. Terrell
Attorney, Agent, or Firm—Spencer & Frank

[57] ABSTRACT

A nine-cornered reversible cutting plate having a plurality of primary cutting edges and secondary cutting edges on each of its upper and lower sides, the primary and secondary cutting edges being of unequal length. The cutting plate is generally shaped as a nine-sided polygon formed by an equilateral triangle whose vertex regions have been replaced by small isosceles triangles, with the primary cutting edges being disposed in the regions of the isosceles triangles and with the ratio of the length of the primary cutting edges to the length of the secondary cutting edges ranging from 1:1.5 to 1:3. The corners between the primary cutting edges and secondary cutting edges are rounded.

7 Claims, 4 Drawing Figures

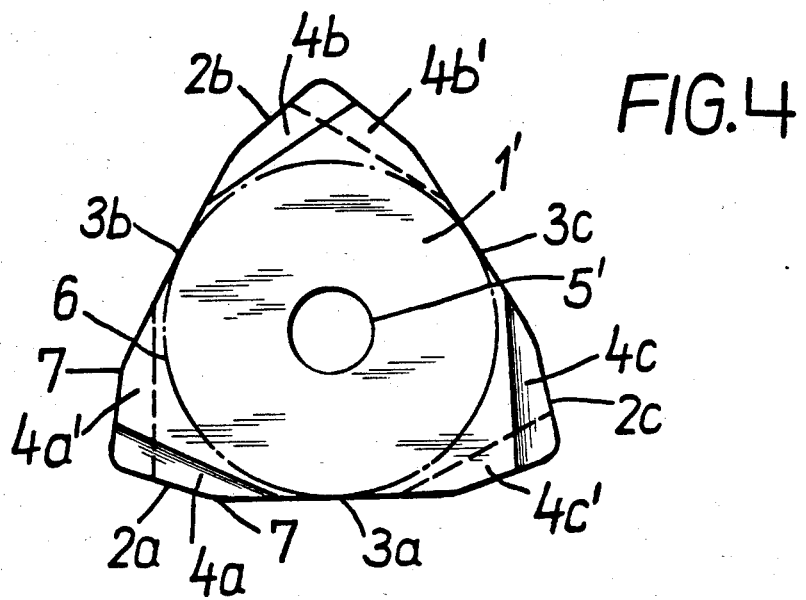

MULTI-CORNERED REVERSIBLE CUTTING-PLATE

BACKGROUND OF THE INVENTION

The present invention relates to a cutting tool for machining a rotating workpiece, and more particularly to a multi-cornered reversible cutting plate which has a plurality of primary and secondary cutting edges of different lengths on its upper and lower sides.

A cutting plate is generally shaped as a nine-sided polygon which resembles an equilateral triangle with symmetrically distorted vertex regions that are formed by isosceles triangles, the base of each isosceles triangle being longer than its remaining sides. The primary cutting edges of the cutting plate are disposed in the regions of the isosceles triangles and are shorter than the secondary cutting edges. Such a reversible cutting plate can be used, for example, during initial machining work on the surfaces of circular rods, shafts, axles and pipes and can be made of high-speed steel and/or other hard metals.

Initial machining is frequently employed in the metal processing industry. Therefore, manufacturers and users of initial machining tools have endeavored to improve the quality of the products produced and to increase the economy of the initial machining process by suitable design of the cutting inserts used for the initial machining tool.

U.S. Pat. No. 3,621,549 discloses a nine-cornered reversible cutting plate of the general type described above. In the arrangement disclosed in the patent, the cutting tool is seated on a surface of an adapter member which in turn is seated on a surface of a tool holder. A chip breaker is mounted on top of the cutting tool and the adapter, cutting tool and chip breaker are secured to the tool holder by a tapered pin which exerts a downward camming force on the chip breaker.

However, this known cutting plate is not very well suited for initial machining because the edges available as the primary cutting edges, in conjunction with their angular positions, permit only a slight depth of cut. Moreover, during initial machining, the patented plate produces feed lines.

SUMMARY OF THE INVENTION

It is an object of the present invention to provide a multi-cornered reversible cutting plate which is particularly suited for initial machining work, which has a large number of usable cutting edges as well as a small volume, and which can cut rapidly while producing a surface of good quality. These objects are accomplished in the present invention by providing a nine-cornered reversible cutting plate in which the ratio of the length of a primary cutting edge to the length of a secondary cutting edge is in the range from 1:1.5 to 1:3, and in which the primary cutting edges merge into the secondary cutting edges through rounded corners. The radii of the rounded corners correspond approximately to the radius of the circle enclosed by the reversible cutting plate.

The configuration of the reversible cutting plate according to the present invention assures that the cutting plate has a comparatively small volume. The short length of the primary cutting edges compared to the length of the secondary cutting edges assures uniform absorption and dissipation of the cutting forces generated during the initial machining process so that even with a high rate of advance, the cutting plate will experience uniform wear, particularly in its corner regions. Each of the six primary cutting edges and six secondary cutting edges of the reversible cutting plate can therefore be used since they are all subject to the same wear.

These advantages of the present invention result from the novel relationship between the ratio of the length of the primary cutting edges to the length of the secondary cutting edges and of the rounded transition from the short primary cutting edges to the longer secondary cutting edges. Additionally, the rounded transition from the primary to the secondary cutting edges smoothes the advancing grooves which are produced during initial machining. A reversible cutting plate designed according to the present invention exhibits relatively greater stability, particularly in the corner regions, and permits initial machining at high advance rates and with good surface quality.

With the reversible cutting plates according to the present invention, chip discharge can be improved since each primary cutting edge has an associated chip forming groove which extends approximately parallel to the primary cutting edge.

A further feature of the invention is that a clamping depression is provided in the center of the top and bottom sides of the reversible cutting plate or that a fastening hole is provided in the center of the reversible cutting plate. The reversible cutting plate is securely clamped in the initial machining tool via the clamping depression or the fastening hole.

BRIEF DESCRIPTION OF THE DRAWINGS

FIG. 4 is a top view of a reversible cutting plate having a mounting hole rather than clamping depressions.

DESCRIPTION OF THE PREFERRED EMBODIMENT

Figure 1:
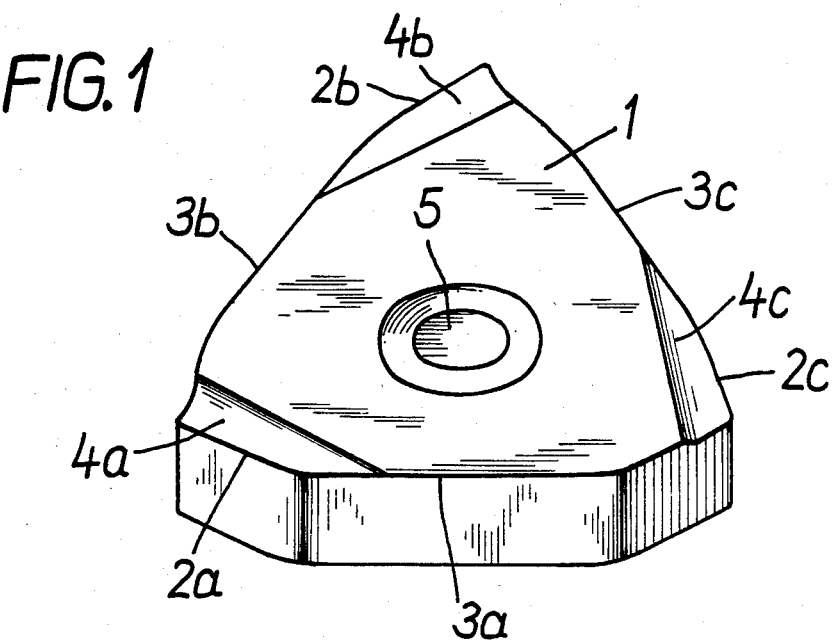
FIG. 1 is a perspective view of the reversible cutting plate according to the present invention.

Referring to the drawing figures, the reversible cutting plate 1 is made of a sintered hard metal composed of a binder metal, preferably cobalt, and a hard substance, preferably tungsten carbide. However, the plate may also be made of high-speed steel or of a basic steel body with soldered-in hard metal inserts.

Figure 2:
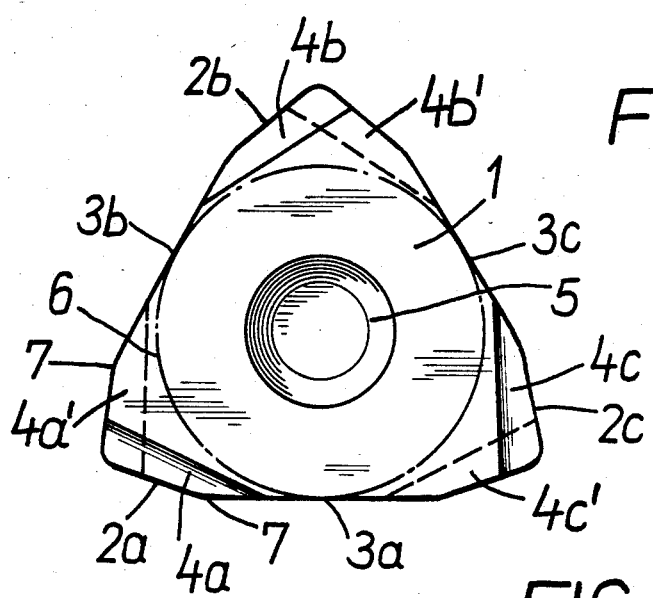
FIG. 2 is a top view of the reversible cutting plate.
Figure 3:
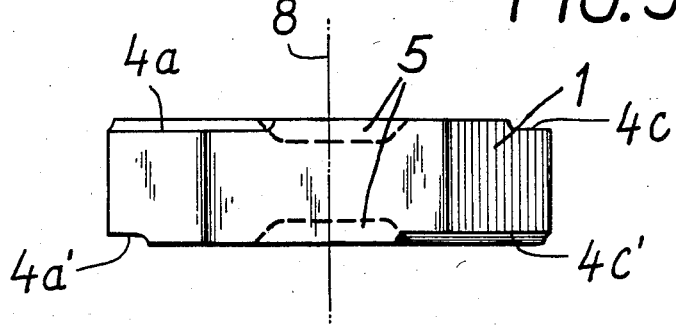
FIG. 3 is a side view of the reversible cutting plate.

Reversible cutting plate 1 has nine corners and has the shape of an equilateral triangle whose vertexes are bent over symmetrically. That is, as is illustrated in FIG. 2, the reversible cutting plate 1 is generally shaped as an equilaterial triangle whose vertex regions are symmetrically replaced by isosceles triangles, the apex angles of these isosceles triangles being greater than the apex angles of an equilateral triangle. The underside as well as the upper side of the reversible cutting plate 1 can be used for initial machining because three primary cutting edges are disposed on the underside as well as on the upper side thereof.

The primary cutting edges 2a, 2b, and 2c disposed on the upper side are not parallel to the three primary cutting edges on the underside, but instead face them diagonally so that the orientation of the primary cutting edges as illustrated in FIG. 1 would remain unchanged if the reversible cutting plate 1 were turned over. With this configuration it will be apparent that, at the apex angle between a pair of cutting edges on opposite sides of the reversible cutting plate 1, the cutting forces attack in the opposite directions thereby reducing wear. The secondary cutting edges 3a, 3b and 3c are longer than the primary cutting edges 2a, 2b and 2c. Due to the fact that the secondary cutting edges 3a, 3b and 3c are longer than the primary cutting edges 2a, 2b, 2c disposed at the vertexes of the triangles, a greater advancing rate can be realized during the initial machining process. In general, the primary cutting edges cut faster but produce a rougher finish than the secondary cutting edges.

Chip forming grooves 4a, 4b and 4c are disposed on the upper side of reversible cutting plate 1 approximately parallel to the major cutting edges 2a, 2b and 2c to produce, in a known manner, an improvement in chip flow. In the drawing, the three corresponding chip forming grooves 4a', 4b' and 4c' on the underside are defined by dashed lines. The dashed lines indicate that the primary cutting edges and the chip forming grooves on the underside and on the upper side of the reversible cutting plate 1 face one another and are not disposed on the same side.

On the upper side and on the underside of the reversible cutting plate 1 there is disposed a clamping depression 5 through which the reversible cutting plate 1 is connected to the initial machining tool by a clamping action. The reversible cutting plate may also be clamped tightly via a fastening hole disposed in its center. For example FIG. 4 illustrates a plate 1' with a clamping hole 5'. The nine corners of reversible cutting plate 1 are rounded, with the primary cutting edges 2a, 2b and 2c smoothly merging into the secondary cutting edges 3a, 3b and 3c, as at rounded corners 7, along arcs having radii corresponding approximately to the radius enclosed by the circle 6 of the reversible cutting plate 1. The upper and lower sides of reversible cutting plate 1 are parallel to one another, and perpendicular to axis 8 and the peripheral surface between these two sides is substantially normal to the upper and lower sides.

It will be understood that the above description of the present invention is susceptible to various modifications, changes and adaptations, and the same are intended to be comprehended within the meaning and range of equivalents of the appended claims.

What is claimed is:

1. A multi-cornered reversible cutting plate of the type having an upper side and a lower side, each of the upper and lower sides having a plurality of primary and secondary cutting edges of different lengths, said cutting plate being configured substantially as a nine-sided polygon formed by an equilateral triangle whose vertex regions have been symmetrically replaced by equal isosceles triangles having apex angles that are larger than the angles of an equilateral triangle, the primary cutting edges being disposed in the regions of the isosceles triangles and being shorter than the secondary cutting edges, wherein the improvement comprises: that the ratio of the length of each of said primary cutting edges to the length of each of said secondary cutting edges ranges from 1:1.5 to 1:3, and that said primary cutting edges intersect said secondary cutting edges at rounded corners, with the radii of the rounded corners corresponding substantially to the radius of a circle that is tangent to each of the sides of the equilateral triangle.

2. The reversible cutting plate defined in claim 1, wherein the distance between the upper and lower sides along the primary cutting edges is less than the distance between the upper and lower sides at the middle of the secondary cutting edges to provide a chip forming groove corresponding to each primary cutting edge, each chip forming groove extending substantially parallel to the corresponding primary cutting edge.

3. A reversible cutting plate as defined in claim 2 wherein each of the upper and lower sides has a depression disposed at the center thereof for mounting the cutting plate.

4. The reversible cutting plate as defined in claim 2, wherein an opening extends through the cutting plate between the centers of the upper and lower sides to provide a fastening hole for mounting the cutting plate.

5. A reversible cutting plate, comprising:

a flat element having a first side with portions thereof lying in a first plane, a second side with portions thereof lying in a second plane that is parallel to the first plane, and a periphery substantially formed by a plurality of first and second substantially flat faces each lying in a plane perpendicular to the first and second planes and each joining the two adjacent faces at corners, the ratio of the length of said first faces to the length of said second faces ranging from 1:1.5 to 1:3, said flat element having a center and an axis running through the center perpendicular to the first and second planes, said second faces being disposed about the periphery of said flat element in such a manner that there is a pair of first faces that are adjacent one another between every two second faces and so that, for each second face, there exists a plane in which the axis lies that is perpendicular to the second face, said first faces being disposed about the periphery of the flat element in such a manner that, for every pair of adjacent first faces, the angle between a plane in which the axis and the corner between the adjacent first faces lie and one of the two adjacent first faces is substantially equal to the angle between said plane in which the axis and the corner between the adjacent first faces lie and the other of the two adjacent first faces, and wherein said flat element is configured to provide a primary cutting edge at the intersection of the first side thereof and one of each pair of adjacent first faces and a primary cutting edge at the intersection of the second side thereof and the other of each pair of adjacent first faces, said flat element additionally being configured to provide a secondary cutting edge at the intersection of the first side thereof and the second face adjacent each first face that provides a primary cutting edge at the first side of the flat element and a secondary cutting edge at the intersection of the second side thereof and the second face adjacent each first face that provides a primary cutting edge at the second side of the flat element, the corners between each adjacent first and second face that provide cutting edges on the same side of the flat element being rounded, wherein said flat element additionally comprises means adjacent the axis thereof for mounting the flat element, wherein for every primary cutting edge at the intersection of a first face and the first side of the flat element, the first side of the flat element has a chip forming groove beginning at a line in the first plane and substantially parallel to the primary cutting edge and ending at the primary cutting edge and between the first and second planes, and for every primary cutting edge at the intersection of a first face and the second side of the flat element, the second side of the flat element has a chip forming groove beginning at a line in the second plane and substantially parallel to the primary cutting edge and ending at the primary cutting edge and between the first and second planes, wherein the flat element has six first faces and three second faces, and wherein the rounded corners between each adjacent primary and secondary cutting edge on the same side of the flat element have radii substantially equal to the distance from the axis to the face closest thereto.

6. The cutting plate of claim 5, wherein the flat element comprises a sintered hard substance including tungsten carbide and a binder metal.

7. The cutting plate of claim 5, wherein the flat element comprises high-speed steel.

* * * * *